C. D. GALLOWAY.
STORAGE BATTERY PLATE OR ELECTRODE.
APPLICATION FILED SEPT. 4, 1918.

1,370,014. Patented Mar. 1, 1921.

WITNESS:
Robt R Kitchel.

INVENTOR
Charles D. Galloway
BY
Augustus B. Stoughton,
ATTORNEY.

UNITED STATES PATENT OFFICE.

CHARLES D. GALLOWAY, OF PHILADELPHIA, PENNSYLVANIA.

STORAGE-BATTERY PLATE OR ELECTRODE.

1,370,014.   Specification of Letters Patent.   Patented Mar. 1, 1921.

Application filed September 4, 1918. Serial No. 252,535.

*To all whom it may concern:*

Be it known that I, CHARLES D. GALLOWAY, a citizen of the United States, residing at Philadelphia, in the county of Philadelphia and State of Pennsylvania, have invented certain new and useful Improvements in Storage-Battery Plates or Electrodes, of which the following is a specification.

The principal object of the present invention is to provide a cheaply and expeditiously made end construction for plates including rods surrounded by active material or material adapted to become active inclosed in perforated or slotted insulating tubes or envelops, which construction shall be strong and solid and shall contact with the ends of the active material or material adapted to become active and with the ends of the tubes and shall fill the ends of the tubes, although these ends are uneven or at different levels in the respective tubes, so that trimming and fitting with their disadvantages are not required. Other objects of the invention will appear from the following description which will be given in connection with the accompanying drawings forming part hereof and in which—

Figure 3:
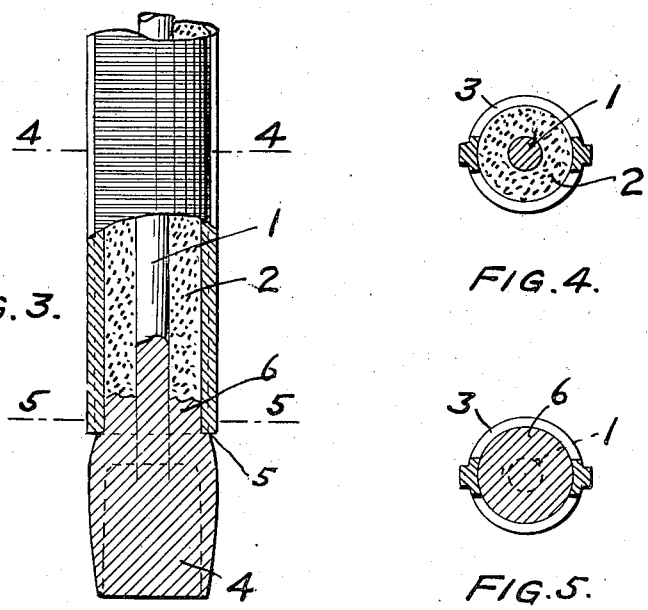
Figure 4:
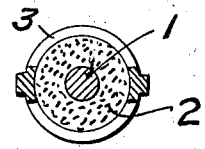
Figure 5:
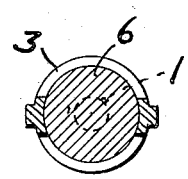

Fig. 3, is a transverse sectional view drawn to an enlarged scale and illustrating the end construction, and Figs. 4 and 5, are sections respectively on the lines 4—4 and 5—5 of Fig. 3.

In the drawings the metallic conducting rods 1, surrounded by active material or material adapted to become active 2, inclosed in insulating slotted or perforated tubes or retainers 3, are features of construction of well known elements or plates.

Figure 1:
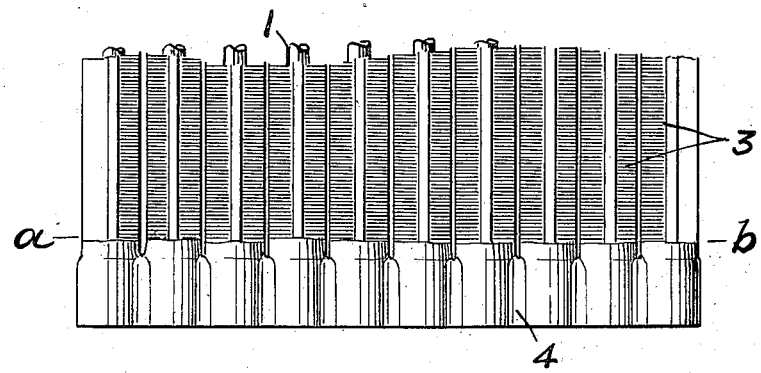
Figure 1, is a side elevation of a part of a plate or electrode embodying features of the invention.
Figure 2:
Fig. 2, is an inverted plan of the same.

The end construction of the invention consists of a poured connecting bar 4, fitting inequalities in the lengths of the tubes 3, and contacting with the ends of the tubes as at 5. By a poured bar is meant that the ends of the tubes 3, and of the rods 1, are arranged in a mold and the bar 4, is made by pouring molten metal into the mold. Inequalities in the lengths of the tubes 3, means that they end at different levels as indicated by the line *a—b*, in Fig 1, but since the bar is poured it contacts with the ends of all the tubes as at 5, and so it is unnecessary to trim the tubes. Moreover such a bar 4, is cheap and easy to make. Portions 6, of the bar fill the ends of the tubes and fit inequalities in the ends of active material or material adapted to become active 2, and contact with these ends although they are at different levels, due for instance to some of the material 2, falling out of the ends of the tubes which is a matter of common occurrence. The end construction is therefore solid and strong and of good electrical conductivity. The ends of the rods 1, merge into the bar 4, and therefore these ends may be at different levels.

What I claim is:

1. In a storage battery plate or electrode, including metal rods surrounded with active material or material adapted to become active inclosed in perforated insulating tubes or envelops, and in combination therewith, an end construction consisting of a poured connecting bar fitting inequalities in the lengths of the tubes and contacting with the ends of the tubes and portions of said bar filling the ends of the tubes and fitting inequalities in the ends of the active material or material adapted to become active and contacting therewith and said bar and the ends of said rods being joined by merger, substantially as described.

2. In the manufacture of a storage battery plate or electrode including metal rods surrounded with active material or material adapted to become active inclosed in perforated insulating tubes or envelops, the method of making and joining an end bar which consists in applying it while molten directly to the rods and tubes and material, whereby the rods and end bar are connected.

C. D. GALLOWAY.